(12) United States Patent
Ryan

(10) Patent No.: US 6,538,839 B1
(45) Date of Patent: Mar. 25, 2003

(54) DISK DRIVE EMPLOYING ADAPTIVE FEED-FORWARD VIBRATION COMPENSATION TO ENHANCE A RETRY OPERATION

(75) Inventor: Robert P. Ryan, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 240 days.

(21) Appl. No.: 09/773,970

(22) Filed: Jan. 31, 2001

(51) Int. Cl.[7] .......................... G11B 5/596; G11B 21/02
(52) U.S. Cl. .................... 360/77.02; 360/75; 360/77.07
(58) Field of Search .......................... 360/77.02, 77.03, 360/77.04, 75, 77.07, 77.08, 78.04, 61; 318/560, 561

(56) References Cited

U.S. PATENT DOCUMENTS

| | | | |
|---|---|---|---|
| 4,947,093 A | 8/1990 | Dunstan et al. | |
| 5,299,075 A * | 3/1994 | Hanks | 360/77.02 |
| 5,402,400 A * | 3/1995 | Hamada et al. | 369/32 |
| 5,426,545 A | 6/1995 | Sidman et al. | |
| 5,521,772 A | 5/1996 | Lee et al. | |
| 5,550,685 A * | 8/1996 | Drouin | 360/77.08 |
| 5,663,847 A | 9/1997 | Abramovitch | |
| 5,721,457 A | 2/1998 | Sri-Jayantha et al. | |
| 6,115,200 A | 9/2000 | Allen et al. | |
| 6,456,452 B1 * | 9/2002 | Hobson et al. | 360/78.07 |

* cited by examiner

Primary Examiner—Andrew L. Sniezek
(74) Attorney, Agent, or Firm—Milad G. Shara, Esq.; Howard H. Sheerin, Esq.

(57) ABSTRACT

A disk drive is disclosed comprising a head, and an actuator, responsive to an adjusted control effort signal, for actuating the head radially over a disk. An adaptive feed-forward signal is generated in response to a vibration affecting the disk drive and combined with a nominal control effort signal to generate the adjusted control effort signal. During a normal read operation the feed-forward signal is substantially removed from the adjusted control effort signal, and during a retry read operation the feed-forward signal is included in the adjusted control effort signal.

8 Claims, 9 Drawing Sheets

DISK DRIVE EMPLOYING ADAPTIVE FEED-FORWARD VIBRATION COMPENSATION TO ENHANCE A RETRY OPERATION

CROSS REFERENCE TO RELATED APPLICATIONS AND PATENTS

This application is related to co-pending patent application Ser. No. 09/728,626 entitled "VIBRATION CANCELLATION IN A DISK DRIVE BY USING AN ACCELERATION SENSOR AND ADAPTIVELY ADJUSTING ITS GAIN TO MINIMIZE EXTERNAL ACCELERATION EFFECTS" filed on Nov. 30, 2000, the disclosure of which is incorporated herein by reference.

FIELD OF THE INVENTION

The present invention relates generally to disk drives and, more particularly, to a disk drive employing adaptive feed-forward vibration compensation to enhance a retry operation.

BACKGROUND OF THE RELATED ART

Vibrations affecting the actuator arm in a disk drive degrade the performance of the recording/reproduction process. The errors induced by the vibrations may exceed the correction power of the sector level error correction code (ECC). When this happens, the disk drive typically executes a retry operation wherein predetermined parameters (e.g., read channel parameters) are "fine tuned" before attempting to reread the sector. The disk drive may execute several retries while varying the parameters until the sector is successfully recovered. The likelihood of successfully recovering a sector depends on the flexibility of the system to achieve the necessary signal-to-noise ratio (SNR) to enable recovery of the sector. To this end, it is desirable to "fine tune" several aspects of the recording/reproduction process so that several attempts can be made to recovery a sector before declaring it unrecoverable.

SUMMARY OF THE INVENTION

The present invention may be regarded as a disk drive comprising a disk having a plurality of tracks. The disk drive further comprises a head, and an actuator responsive to an adjusted control effort signal for actuating the head radially over the disk. The disk drive includes a servo control system for generating the adjusted control effort signal. The servo control system comprises a position error generator for generating a position error signal indicative of the head's position with respect to a centerline of a selected track. The servo control system further comprises a servo compensator, responsive to the position error signal, for generating a nominal control effort signal, and sensor for sensing a vibration affecting the disk drive to generate a sensor signal. An adaptive vibration compensator, responsive to the sensor signal, generates a feed-forward signal. A signal generator combines the nominal control effort signal with the feed-forward signal to generate the adjusted control effort signal applied to the actuator. During a normal read operation the adaptive compensator is disabled to substantially remove the contribution of the feed-forward signal from the adjusted control effort signal, and during a retry read operation the adaptive compensator is enabled to include the contribution of the feed-forward signal in the adjusted control effort signal.

In one embodiment, the disk drive further comprises a plurality of programmable parameters. During a first number of disk revolutions of the retry read operation the disk drive modifies the programmable parameters with the adaptive vibration compensator disabled. During a second number of disk revolutions of the retry read operation the disk drive enables the adaptive vibration compensator. In one embodiment, the adaptive vibration compensator comprises a programmable closed-loop parameter, and during the second number of disk revolutions the disk drive adjusts the closed-loop parameter.

In another embodiment the disk drive disables a normal write operation if the sensor signal exceeds a predetermined threshold.

The present invention may also be regarded as a method of enhancing a retry read operation in a disk drive comprising a disk having a plurality of tracks, a head, an actuator responsive to an adjusted control effort signal for actuating the head radially over the disk, and a servo control system for generating the adjusted control effort signal. A position error signal indicative of the head's position with respect to a centerline of a selected track is generated, and a nominal control effort signal is generated from the position error signal. A vibration affecting the disk drive is sensed to generate a sensor signal, and a feed-forward signal is generated in response to the sensor signal. The feed-forward signal is combined with the nominal control effort signal to generate the adjusted control effort signal. During a normal read operation, the contribution of the feed-forward signal is substantially removed from the adjusted control effort signal,.and during a retry read operation, the contribution of the feed-forward signal is included in the adjusted control effort signal.

BRIEF DESCRIPTION OF THE DRAWINGS

The just summarized invention can be best understood with reference to the following description taken in view of the drawings of which.

DETAILED DESCRIPTION OF THE EMBODIMENTS

Figure 1:
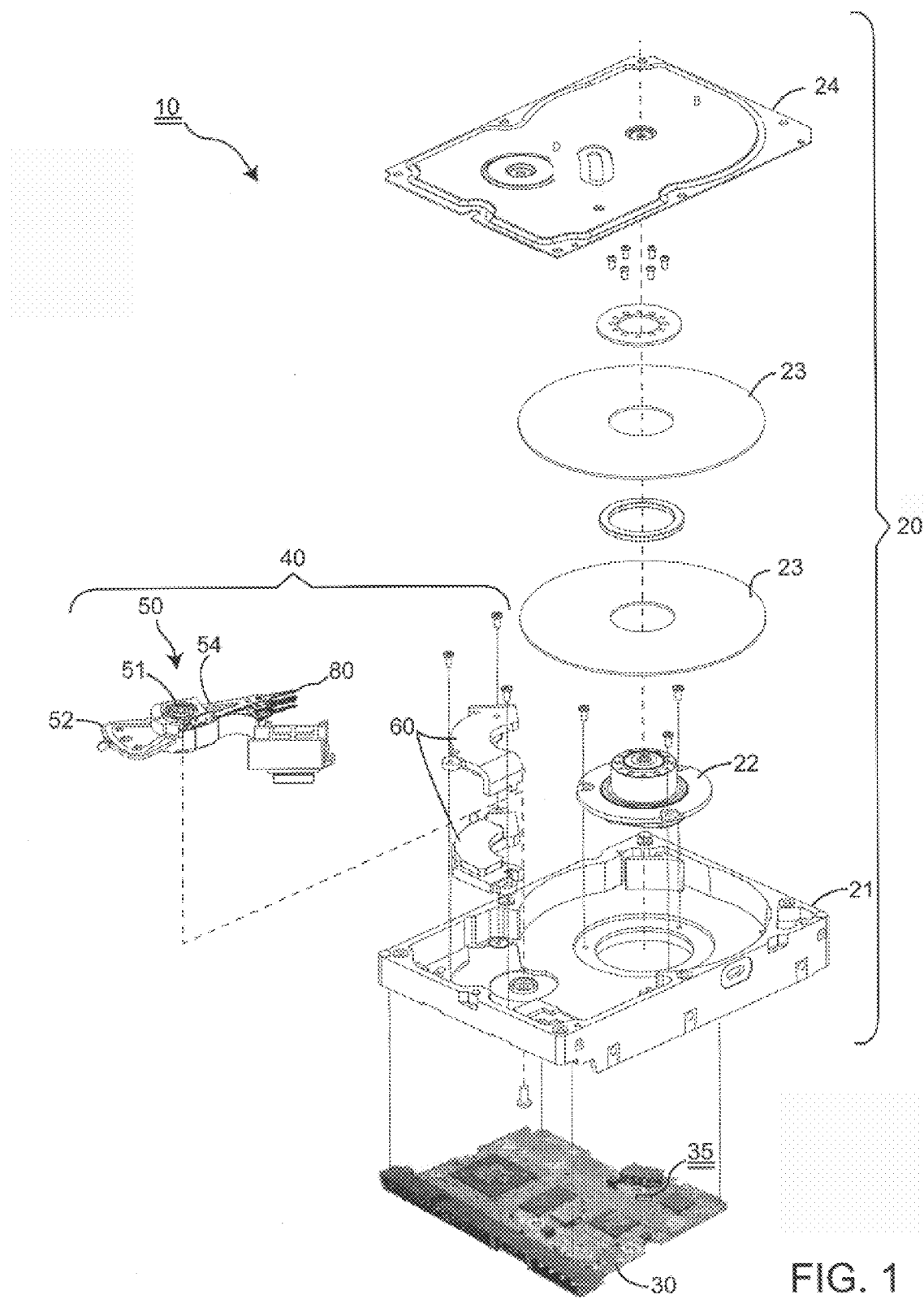
FIG. 1 is an exploded perspective view of a magnetic disk drive 10 according to an embodiment of the invention, the disk drive having a head disk assembly 20 ("HDA") that contains a magnetic disk 23, a rotary actuator 50, and an acceleration sensor 35 that moves rigidly with the HDA 20.
Figure 4:
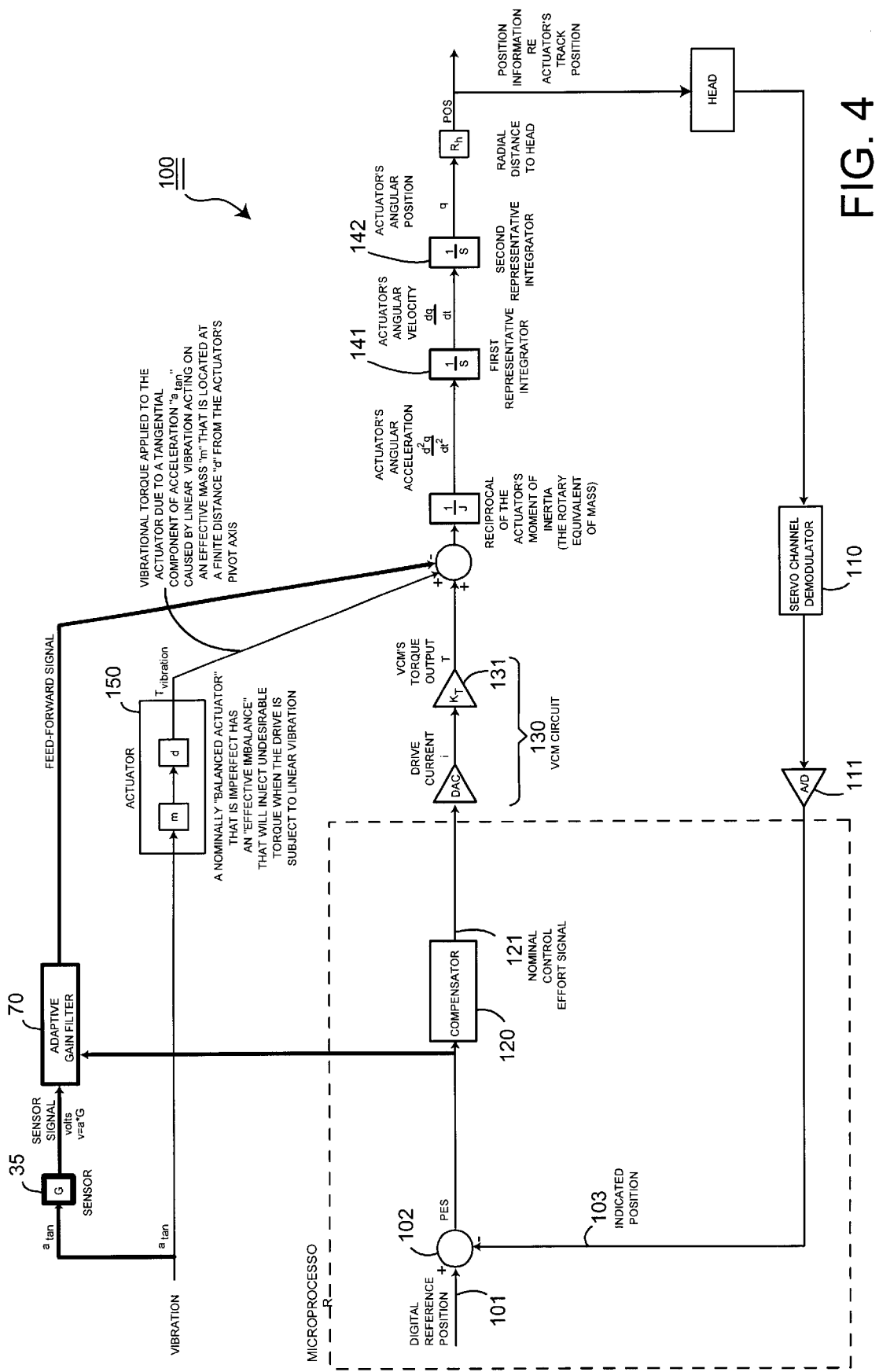
FIG. 4 is a simplified schematic diagram of an embodiment of the present invention that figuratively shows, in bold, how a sensor that outputs a sensor signal in proportion to the linear vibration experienced by the imbalanced actuator can be modified with an adaptive gain filter, on the basis of the PES and sensor signal associated with a presently active servo wedge, in order to produce a cancellation torque that is likely to substantially cancel the vibrational torque that would otherwise result in a movement of the actuator.
Figure 5:
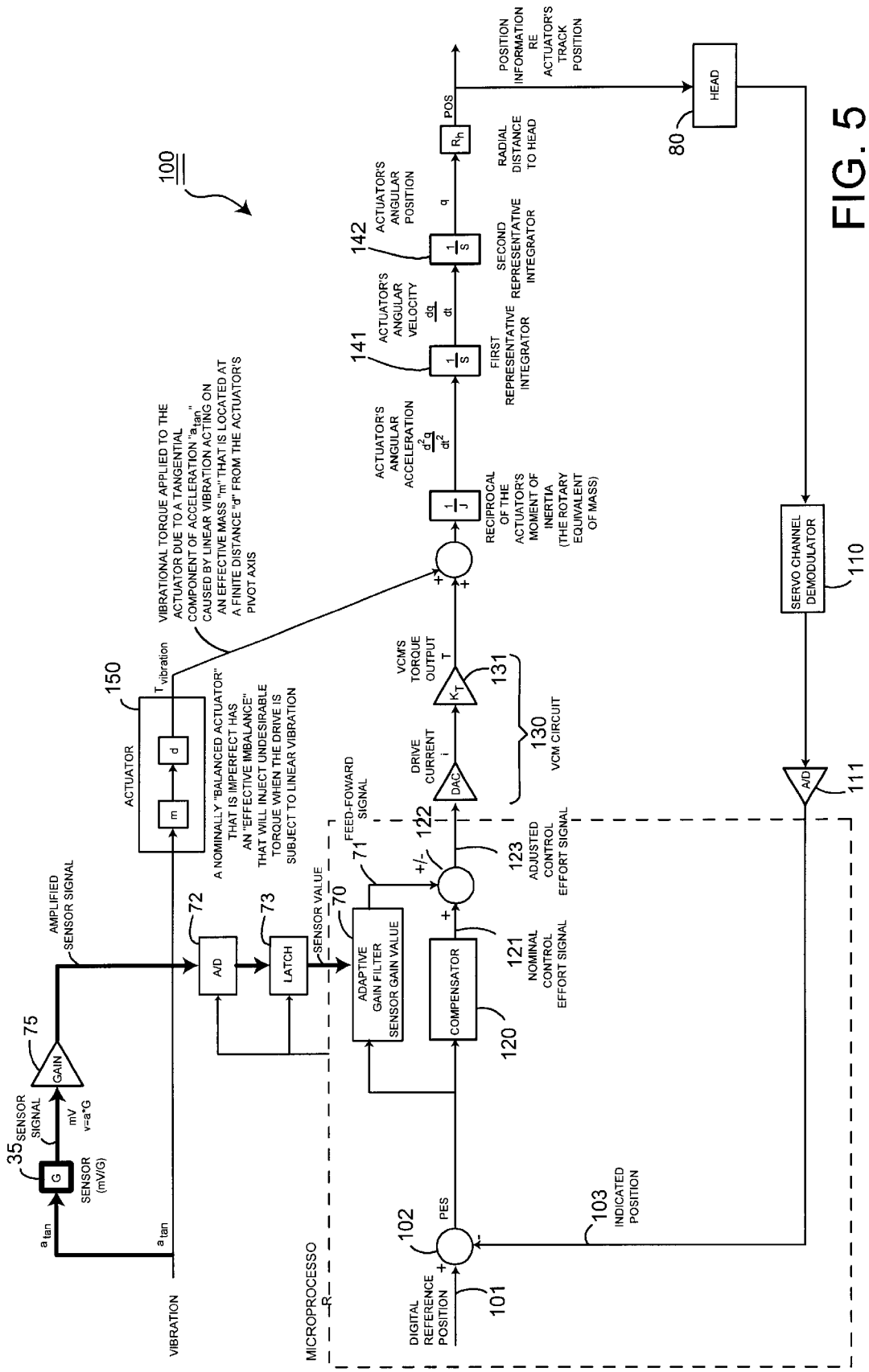
FIG. 5 is a simplified schematic diagram of an embodiment of the present invention that operates in principle as shown in FIG. 4, but wherein suitable firmware that controls the microprocessor is used to implement the adaptive gain filter, the output of which is a feed-forward signal that is used to adjust a nominal control effort signal and produce an adjusted control effort signal 123.

FIG. 1 shows a disk drive 10 according to an embodiment of the invention. The embodiment of FIG. 1 is directed to using a sensor (e.g. accelerometer) 35 used during a retry read operation for reducing off-tracks caused by external vibration in the disk drive's environment. An adaptive compensator processes the signal from the sensor 35, which is proportional to the vibration level, to generate a feed-forward signal. The feed-forward signal is combined with a nominal control effort signal to generate an adjusted control effort signal, thereby canceling or reducing the effects of the vibration. As best shown in FIGS. 4 and 5 and as discussed below, in one embodiment an adaptive algorithm continuously adjusts a gain (by adjusting one or multiple filter coefficients) to adjust the feed-forward signal using the position error signal (PES) as a measure of the vibration-induced accelerations. During normal read and write operations, the feed-forward signal is substantially removed from the control effort signal.

In one embodiment, a notch filter or a low pass filter circuitry can minimize the effects of the sensor resonances so that the sensor signal will be representative of the pure external vibration that is being sensed.

Returning to FIG. 1, the disk drive 10 comprises a head disk assembly ("HDA") 20 including a base 21, a rotating disk 23, and a rotary actuator 50 that pivots relative to the base 21. In this embodiment, the disk drive 10 further comprises a motion sensor 35 that is rigidly mounted relative to the base 21 such that one moves with the outer. Its sense axis (not labeled) is preferably substantially aligned with a line that is tangent to the arcuate motion of the actuator 50. The sensor 35, in other words, is positioned in order to detect the same acceleration components that tend to move an actuator 50 that has an imbalance.

A suitable sensor 35 is a linear accelerometer with a single sense axis, but multi-axis sensors and other types of motion sensors altogether may also be used in accordance with this invention. Sensors of these nature are well known to those of ordinary skill in the field.

In one embodiment, a PC Board Assembly (PCBA) 30 that contains suitable control electronics is rigidly mounted to an underside of the base 21. The disk 23 is rotated by a spindle motor 22. The rotary actuator 50 rotates about a pivot axis extending through a center of a pivot cartridge 51 that secures the actuator 50 to the base 21, adjacent to the disk 23. An actuator arm 54 extends to one side in order to carry a head 80 over the disk 23 for reading and writing data therefrom and a voice coil 52 extends from the other side for interacting with a pair of permanent magnets 60. The voice coil 52 and magnets 60 are frequently regarded as a "voice coil motor", or VCM 40. A cover plate 24 encloses the foregoing components in a cavity within the base 21.

The first sensor 35 is rigidly coupled to the base 21. As shown in FIG. 1, however, it may be indirectly mounted to the base 21 by being mounted to the PCBA 30 that is itself rigidly mounted to the base 21. It is possible, of course, to mount the first sensor 35 directly to the base 21, or to mount it to any other structure that is, in turn, fixed to the base 21. Before describing the embodiments of the present invention, it is helpful to understand the configuration and operation of a typical prior art servo control system.

Figure 2:
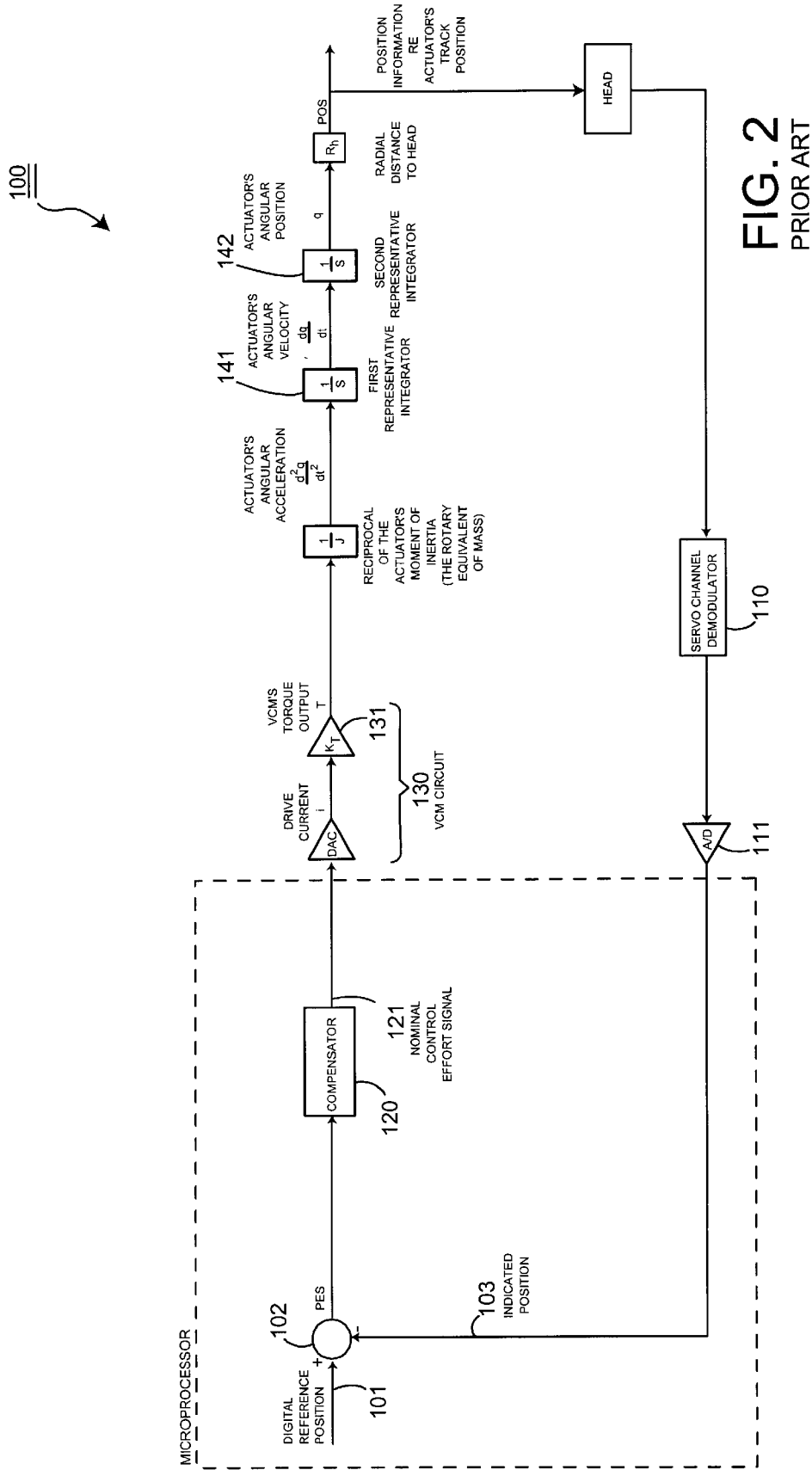
FIG. 2 is a simplified schematic diagram of a prior art, servo control system that is used to keep the transducer 80 in an on-track position while track following.

FIG. 2 is simplified diagram of a prior art control system model that is used for controlling a disk drive 10 during a track following operation.

In normal operation, the control system 100 receives a digital reference position 101 in accordance with a request from a host computer (not shown). An indicated position 103 is also available on a periodic basis by virtue of embedded servo sectors that are periodically read by the head 80 from a disk surface, processed through a servo channel demodulator 110, and converted to a digital value by an N/D converter 111.

A summing junction 102 subtracts the indicated position 103 from the target reference 101 to produce a position error signal PES that is provided to a suitable compensator 120 to produce a nominal control effort signal 121 that is provided to a VCM circuit 130 that, in the usual embodiment, includes a digital-to-analog converter DAC that produces a current "i" for accelerating the VCM 40 (see FIG. 1) in a direction and magnitude that is in accordance with the direction and magnitude of the PES.

As suggested by the gain block 131, the drive current "i" generates a torque T according to a torque conversion factor, $K_T$, where $T=i*K_T$. The applied torque, of course, accelerates the rotary actuator 50 at an angular acceleration $$\frac{d^2\theta}{dt^2}$$

that is a function of the applied torque T and the actuator's angular moment of inertia J. Over time, as suggested by the simplified 1/s system blocks 141, 142, the acceleration $$\frac{d^2\theta}{dt^2}$$

results in an angular velocity $$\frac{d\theta}{dt}$$

and an angular position θ. A change in the angular position Δθ causes the head 80 to move along an arc as a function of the radial distance $R_h$ from the pivot cartridge 51 to the head 80. By periodically sampling the position information on the disk 23 to provide the indicated position 103, and then correcting relative to the reference position 101, the servo control system 100 endeavors to keep the head 80 located at a particular track position POS over the disk 23—a process known as "track following."

The rotary actuator 50 shown in FIG. 1 is a nominally "balanced actuator" in that the center of mass is designed to be located precisely at the pivot axis such that linear accelerations will not generate a relative acceleration between the actuator 50 and the base 21. As a practical matter, however, many rotary actuators 50 are shipped with an operational or effective imbalance even though they are nominally balanced.

Figure 3:
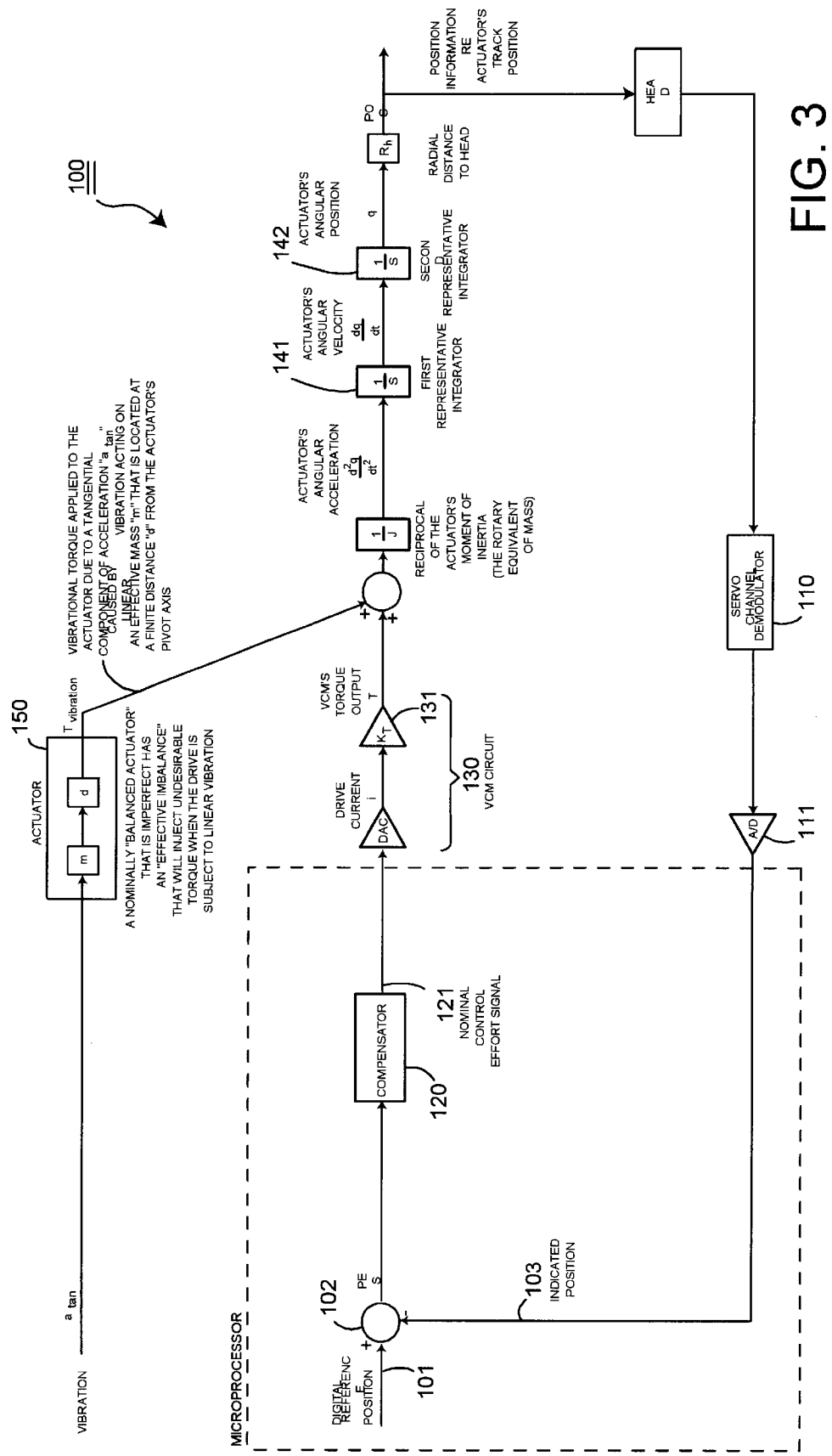
FIG. 3 is a simplified schematic diagram that is similar to FIG. 2, but showing how vibration acting on an imbalanced actuator can impart a vibrational torque that increases track following error.

FIG. 3 is similar to FIG. 2 except that it also includes a block 150 that represents the input from an actuator 50 with an effective imbalance. As suggested by block 150, an actuator 50 with an effective imbalance has a center of mass located at some distance d from the pivot axis. Such an actuator 50 is detrimentally subject to an angular acceleration whenever a linear shock or vibration imparts a force to the off-axis mass. Such an actuator 50, of course, is subject to an acceleration $a_{tan}$ in the presence of a linear vibration with a component of motion that is tangent to the actuator's arcuate movement. As shown, therefore, the imbalanced actuator 50 will experience a disturbance torque input $T_{vib}$ that increases track following error.

The result is the injection of an undesired torque $T_{vib}$ that tends to cause the head 80 to move off-track even while the servo control system is in a track-following mode. An inability to control the actuator 50 in the face of such undesired vibration detrimentally requires a coarser track pitch design than might otherwise be used, makes it possible that the system has to re-read a data track, and makes it possible that the head 80 will over-write an adjacent track when recording data.

We now turn to FIGS. 4, 5 and 6 that represent embodiments of the present invention with increasing degrees of specificity.

FIG. 4 is a simplified schematic diagram that shows how one embodiment uses the PES as an indication of how much impact vibration is having for a given gain, an adaptive gain filter 70 being adjusted accordingly. In particular, as emphasized by the bolder lines, this embodiment uses a sensor 35 that outputs a sensor signal in proportion to the vibration experienced by the imbalanced actuator 50 to modify the adaptive gain filter 70, on the basis of the PES and the sensor signal associated with a presently active servo wedge, in order to produce a feed-forward signal that is likely to substantially cancel the vibrational torque $T_{vib}$ that would otherwise result in a movement of the actuator 50. In this context, a presently active servo wedge refers to control efforts made in response to a present servo sample and a next active servo wedge refers to control efforts made in response to a subsequent servo sample.

FIG. 5 is a simplified schematic diagram of an embodiment that operates in principle as shown in FIG. 4, but wherein suitable firmware that controls the microprocessor is used to implement the adaptive gain filter, the output of which is a feed-forward signal that is.used to adjust a nominal control effort signal 121 and produce an adjusted control effort signal 123. As shown, this embodiment includes an amplifier circuit 75 that increases the amplitude of the sensor's output signal, an A/D converter 72 that periodically samples the amplified sensor signal as directed by the microprocessor, and a latch 73 that stores a digital value output by the A/D converter 72 for provision to the adaptive gain filter 70 as a sensor value. The adaptive gain filter 70, therefore, receives a sensor value and a PES and outputs the feed-forward signal 71.

Figure 6A:
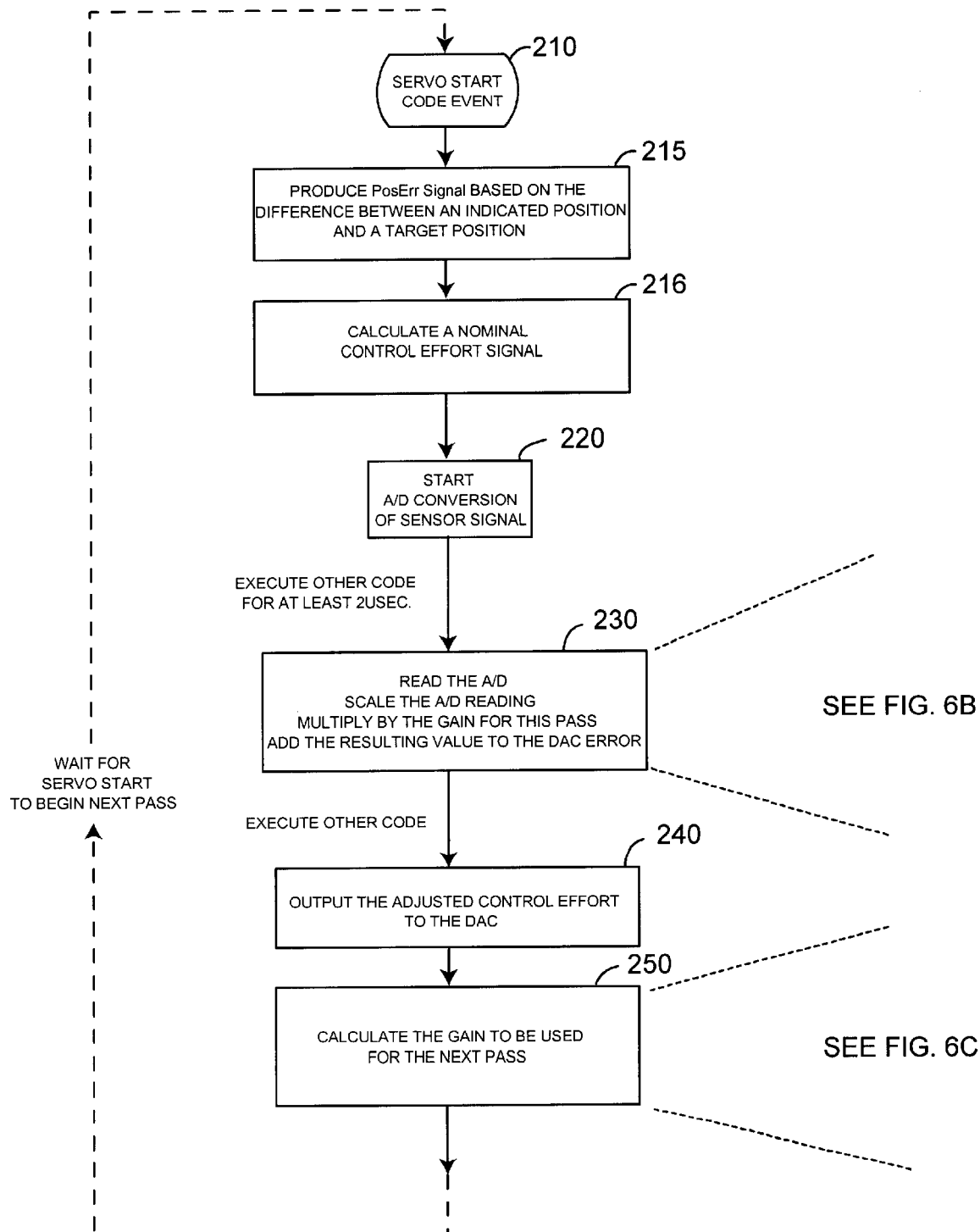
FIG. 6A is a flowchart of a periodic servo control routine according to an embodiment of the present invention, and is executed in response to a servo start code event corresponding-with the detection of a servo sample.

Overview—FIG. 6A

FIG. 6A is a flowchart of a periodic servo control routine that implements an embodiment of the present invention and is executed in response to a servo start code event corresponding with the detection of a servo sample. The depicted process is intended for use in a disk drive 10 like that exemplified by FIGS. 1 and 5, i.e. for use in a magnetic disk drive having a head disk assembly (HDA) 20 including a base 21, a rotating disk 23 that carries position information in a plurality of servo wedges that are distributed around the disk, a rotary actuator 50 that pivots relative to the base and carries a transducer 80 that periodically reads the position information from the servo wedges on the rotating disk, and a VCM circuit 130 that includes a voice coil motor (VCM) 40 that responds to a control effort signal that is periodically adjusted by a servo control system such that the transducer tends to follow a track that is defined by the position information during a track-following operation. As shown, the depicted process is a method of adaptively reducing an effect of vibration during the track following operation comprising several steps.

The method involves mounting a sensor 35 within the magnetic disk drive 10 to produce a sensor signal in response to a vibration that tends to cause the rotary actuator 50 to move off-track. This particular step is shown in FIGS. 1 and 5, but not in FIG. 6.

Step 210 represents the step of reading the position information from a presently active servo wedge. At step 210, after this portion of the firmware has been sitting idle or performing background tasks since processing some earlier servo information, a servo start code event has occurred. This generally corresponds to a "servo interrupt" that is triggered by the detection of a servo sync mark that indicates the beginning a servo sample. Implicit in step 210 are the conventional processes of reading the gray code that generally represents a track ID and the servo bursts that generally represent fractional track position.

Step 215 represents the step of producing a position error signal (PES) based on a difference between the indicated position signal 103 and the reference position signal 101. Any suitable manner of producing a PES may be used.

Step 216 represents the step of calculating a nominal control effort signal based on the position error signal. As with step 215, any suitable manner of calculation may be used. One embodiment uses a digital compensator 120 that is implemented in or controlled by the microprocessor, but other approaches may be used, both digital and analog.

Step 220 represents the prerequisite step of starting an A/D conversion of the sensor signal output by the sensor 35. As noted above with reference to FIG. 5, this step preferably proceeds by sampling, digitizing and then latching an amplified sensor signal that is derived from the acceleration sensor 35. This takes a finite amount of time, so other code may be executed during this time.

Step 230, as shown in more detail in FIG. 6B discussed further below, represents the several steps of reading 231 the sensor signal to produce a sensor value associated with the presently active servo wedge, modifying 235 the sensor value based on a sensor gain value to produce a feed-forward signal, and adjusting 238 the nominal control effort signal with the feed-forward signal to produce an adjusted control effort signal 123.

Step 240 represents the step of outputting the adjusted control effort signal 123 to the VCM circuit 130.

Step 250, as shown in more detail in FIG. 6C discussed further below, represents the step of altering the sensor gain value based on the position error signal and the sensor value associated with the presently active servo wedge for use in a next active servo wedge. Step 250 is a "post processing" step in that it takes place after the output of the control effort.

Figure 6B:
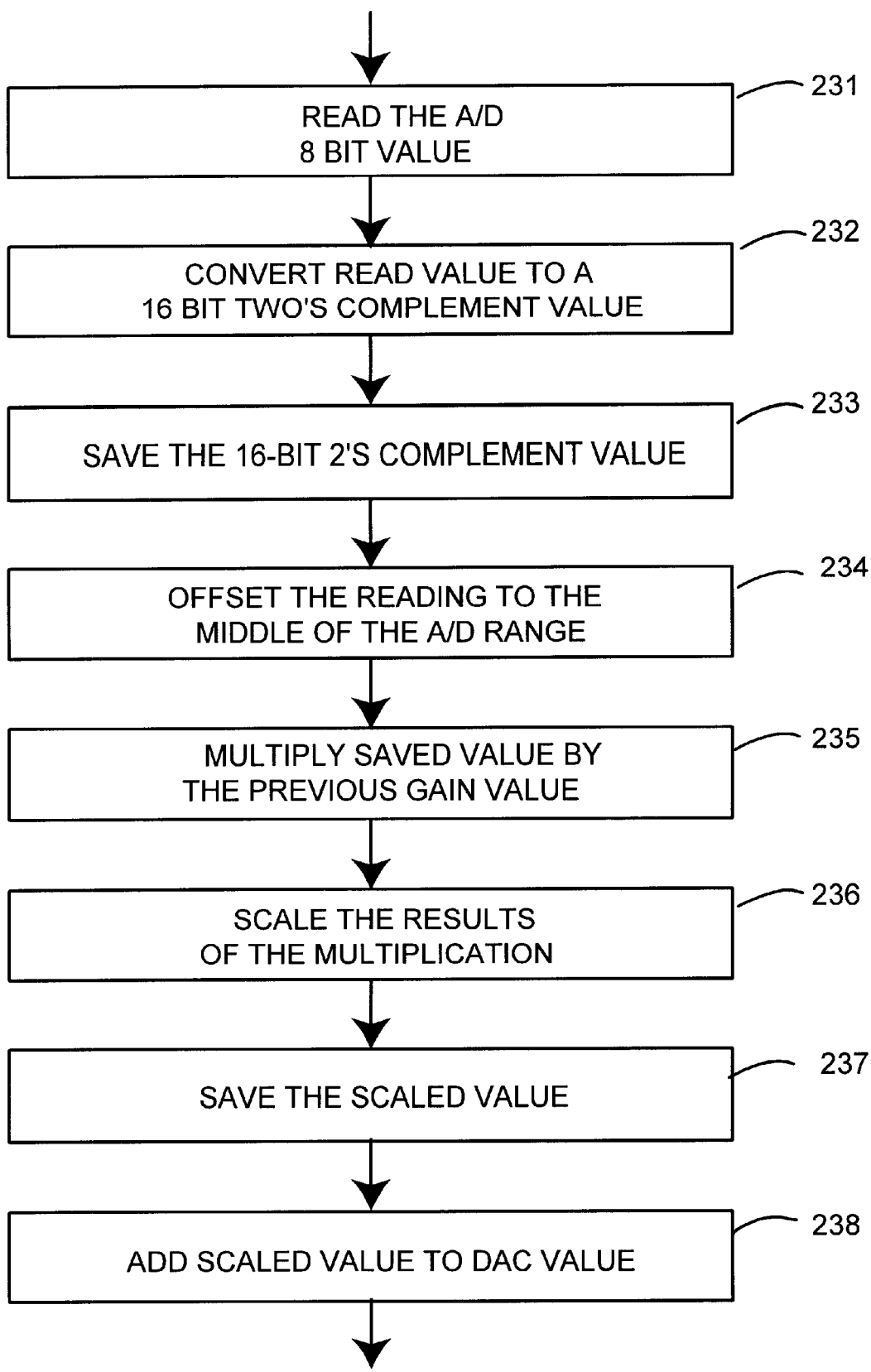
FIG. 6B is a flow chart with a more detailed depiction of the steps that make up step 230 of FIG. 6A.

Step 230 Details—FIG. 6B

FIG. 6B is a more detailed flow chart showing the sub-steps that make up step 230 of FIG. 6A.

At step 231, the system reads the sensor value (i.e. sensor measurement old) that was provided via the A/D converter 72 and the latch 73. In one embodiment, the value is provided with 8-bits of resolution.

At steps 232–233, the system converts the read value to a 16-bit two's complement value and saves that value.

At step 234, the system offsets the reading to the middle of the A/D range to provide a function of the sensor signal value which is named "AffDAC" for use as explained below.

At step 235, the system multiplies the saved value by a previous gain value, i.e. a gain value derived in connection with a servo sample from a previously active servo wedge.

At steps 236–237, the system scales the results of the multiplication to 14-bits of resolution to match the resolution of the DAC in the VCM circuit 130 and saves the scaled value. The scaled value corresponds to the "feed-forward signal" of FIG. 5.

At steps 238, the system adds the scaled value to the DAC value. This corresponds to FIG. 5's depiction of providing the feed-forward signal 71 to the nominal control effort signal 121, via a summing junction 122, to produce the adjusted control effort signal 123.

Returning to step 240 in the overview flow chart of FIG. 6A, and referring to FIG. 5, the adjusted control effort signal 123 is output to the DAC in the VCM circuit 130.

Figure 6C:
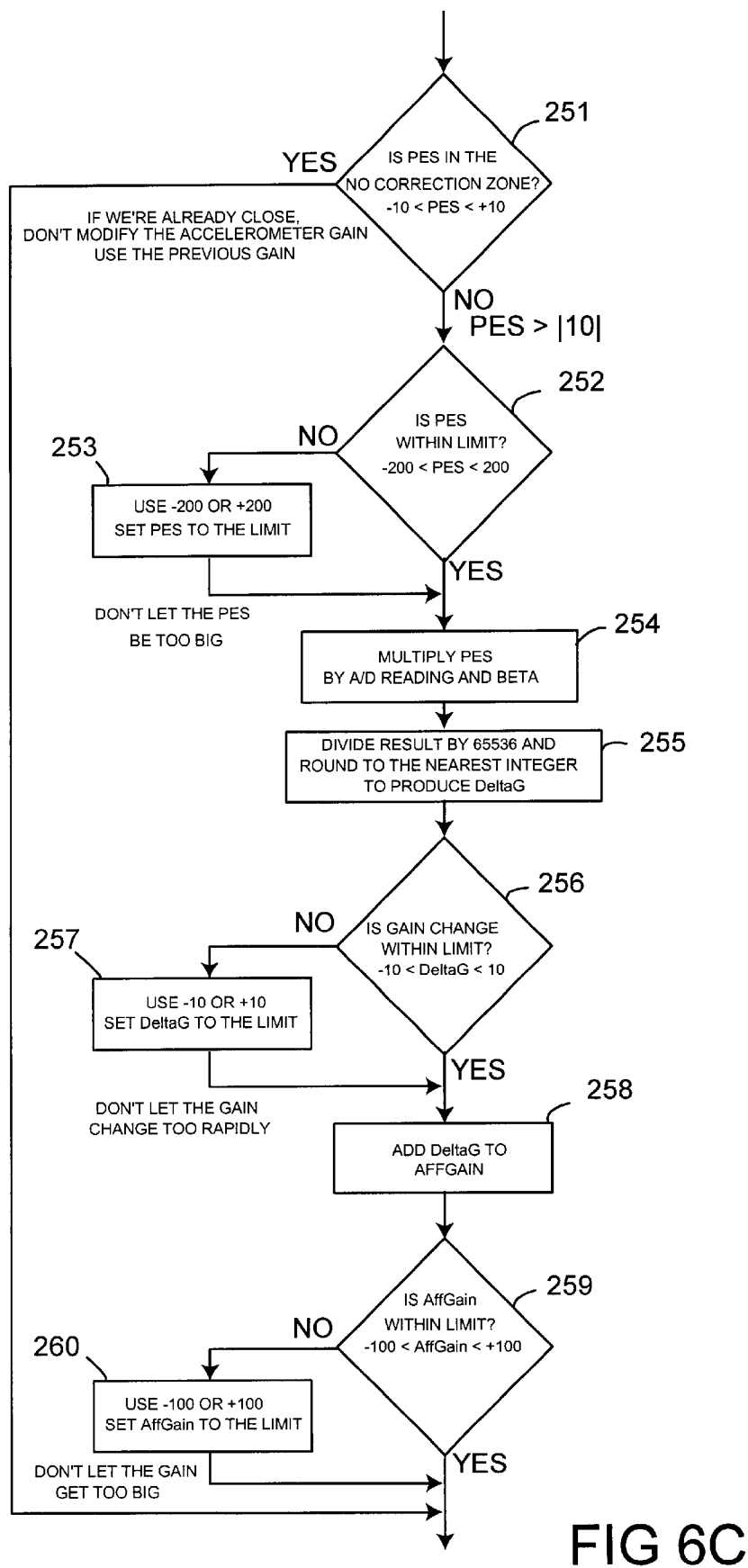
FIG. 6C is a flow chart with a more detailed depiction of the steps that make up step 250 of FIG. 6A.

Step 250 Details—FIG. 6C

FIG. 6C is a more detailed flow chart showing the sub-steps that make up step 250 of FIG. 6A. This is the part of the system where the gain value may be recalculated or altered for use in a next active servo wedge on the basis of the PES and gain value associated with a presently active servo wedge.

As explained elsewhere, the system updates the adaptive gain filter 70 in order to converge on a most optimal set of coefficients or gain value. One embodiment implements the convergence according to a Least Mean Square(LMS) algorithm, but other approaches may be used. Using the LMS approach, this system (1) takes the old coefficient (called AFFGain in the actual code) and (2) modifies it up or down with an adjustment factor (called DeltaG in the actual code) that is computed on the basis of the PES, as suggested by the following equation:

Filter coeff new=(Filter coeff old)–(Convergence rate)=(PES old)= (Function(Sensor Measurement Old))=where Function(Sensor Measurement Old)=AffDAC Using the variable names from the actual code, the foregoing convergence equation may be rewritten as:

AffGain$_{NEW}$=AffGain$_{OLD}$–BETA*PES$_{OLD}$*AffDac

In other words, the new A/D value (Sensor measurement) contained in the latch 73 is partially factored into the actual gain value used in a particular servo wedge based on the predetermined value of BETA (preferably 50 counts from an 8-bit range of 250) and the PES value from a prior servo wedge (usually the immediately prior wedge).

At step 251, the system checks to see if the PES is in a "NO CORRECTION ZONE" defined as +/–10 counts from track center. If "yes," such that actuator 50 is very nearly on track, then the system continues to the bottom of the flow diagram without modifying the gain value. If "no," however, then flow proceeds to step 242.

At step 252, the system clamps the PES to a reasonable value for use in updating the gain value. In this system, the Value of PES used to alter the gain value is limited to +/–200 counts. If the PES is not within limit, flow proceeds through step 253 where either +200 or –200 is substituted for the actual PES. If the PES is within limit (i.e. larger than |+/–10| but smaller than |+/–200|), then flow proceeds directly to step 254.

At step 254, the system multiples PES by the A/D reading from the sensor 35 (see steps 231–234 in FIG. 6B) and by a combination factor BETA. This corresponds to the terms to the right hand side of the "–" sign in the following equation:

AffGain$_{new}$=AffGain$_{old}$–BETA*PES$_{old}$*AffDac

At step 255, the system divides the step 254 result by 65536 ($2^{16}$) and rounds to the nearest integer to produce DeltaG, the nominal gain change based on BETA and the PES. DeltaG may be mathematically regarded (save for the rounding) in light of the prior equation as follows:

DeltaG=BETA*PES$_{old}$*AffDac

At step 256, the system checks to see if the gain change DeltaG is within limits defined as +/–10 counts. If "no," flow proceeds to step 258 via step 257 where the gain change DeltaG is clamped to +10 or –10 as required. If "yes," then flow proceeds directly to step 258.

At step 258, the system adds Delta G to the old gain AffGain$_{old}$ to produce the new gain AffGain$_{new}$ as follows:

AffGain$_{new}$=AffGain$_{old}$+DeltaG

At step 258, the system checks to see that the new gain AffGain$_{new}$ is within limits defined as +/100 counts. If "no," then flow proceeds back to FIG. 6A via step 260 where the new gain AffGain$_{new}$ is clamped to +100 or –100 as appropriate. If "yes," then flow proceeds directly back to FIG. 6A. In either case, a new gain value AffGain$_{new}$ is ready for use in the adaptive gain filter 70 during processing of the position information associated with a next active servo wedge.

The Development of a Suitable Convergence Equation

The mathematical theory used to develop the above convergence equation is as follows. First, the inventors defined adaptive filter algorithm which can converge on the correct (or most optimal gain). This algorithm is based on the Least Means Squared algorithm (LMS for short).

Simply, this algorithm can be defined as:

$W$(present)=$W$(old)–[β*$e$(old)*$X$(old)]

where

W is the vector of a digital FIR (Finite Impulse Response) filter gain, which modifies the Accelerometer output value.

β=convergence rate; larger values cause faster convergence, but can cause instability.

e=position error signal

X=accelerometer output

The theory behind the LMS comes from "gradient search approach" as described by Midway & McCool 76. In this approach, the goal is to minimize a "cost function" J by adjusting the filter gain using the gradient of the cost function. This leads to:

$$\text{filter gain new} = \text{filter gain old} - \beta \frac{dJ}{d(\text{filter gain})}$$

where:

β is convergence rate; and

J is the cost function which is defined to be PES$^2$ in our case. (PES$^2$ will result in +PES and –PES values being minimized)

Assuming N filter parameters, this equation can be written in more general terms as:

$$W(k+1)=W(k)-\beta \nabla (J_{WHEN\ J=j(k)}) k \geq 0$$

where:

$\nabla_W(J)$ is the gradient of J with respect to W
Note: if W is a scalar, then $$\nabla_W(J) = \frac{dJ}{dW}$$

and if $W=(w_1, w_2)$ then $$\nabla_W(J) = \frac{dJ}{dw1} + \frac{dJ}{dw2}$$

i.e., if the filter has more than one coefficient, this approach will update all of the filter coefficients since:

$$J=e^2(k)=PES^2(k)$$

$$W(k+1)=W(k)-\beta \nabla_W(e^2(k))$$

Where $W(k)=[W_1(k), W_2(k), \ldots W_N(k)]$

Error, or e(k), can be viewed as the difference between a reference signal (d(k)) and filter output y(k), i.e. e(k)=d(k)−y(k).

Filter output y(k) is obtained as $W^t X$ since it is the dot product of filter gain vector W and sensor signal regression vector X, i.e.

$$X(k)=[x(k), x(k-1), x(k-2) \ldots x(k-N+1)]$$

then $e(k)=W^t(k)X(k)-d(k)$
rewriting:

$$W(k+1) = W(k) - \beta 2e(k)\nabla_W e(k)$$

$$= W(k) - \beta 2e(k)\nabla_W (W^t(k)X(k) - d(k))$$

Since reference d(k) is not affected by filter changes, $$\nabla_W(d(k))=0$$

Similarly, X is not affected by filter coefficients, hence:

$$\nabla_W(W^t(k)X(k))=X(k)$$

Therefore:

$$W(k+1) = W(k) - \beta 2e(k)[X(k) - 0]$$

$$= W(k) - \beta 2e(k)X(k)$$

These results are similar in the LMS algorithm presented earlier where $\beta 2$ is replaced by $\beta$.
Then we arrive at $$W(k+1)=W(k)-\beta e(k)X(k)$$

which is similar to:

(Filter coeff new)=(Filter coeff old)−(Convergence rate)(PES (old-))Function(Sensor Measurement(Old))

and to $$\text{AffGain}_{NEW}=\text{AffGain}_{OLD}-\text{BETA}*\text{PES}_{OLD}*\text{AffDac}.$$

Figure 7:
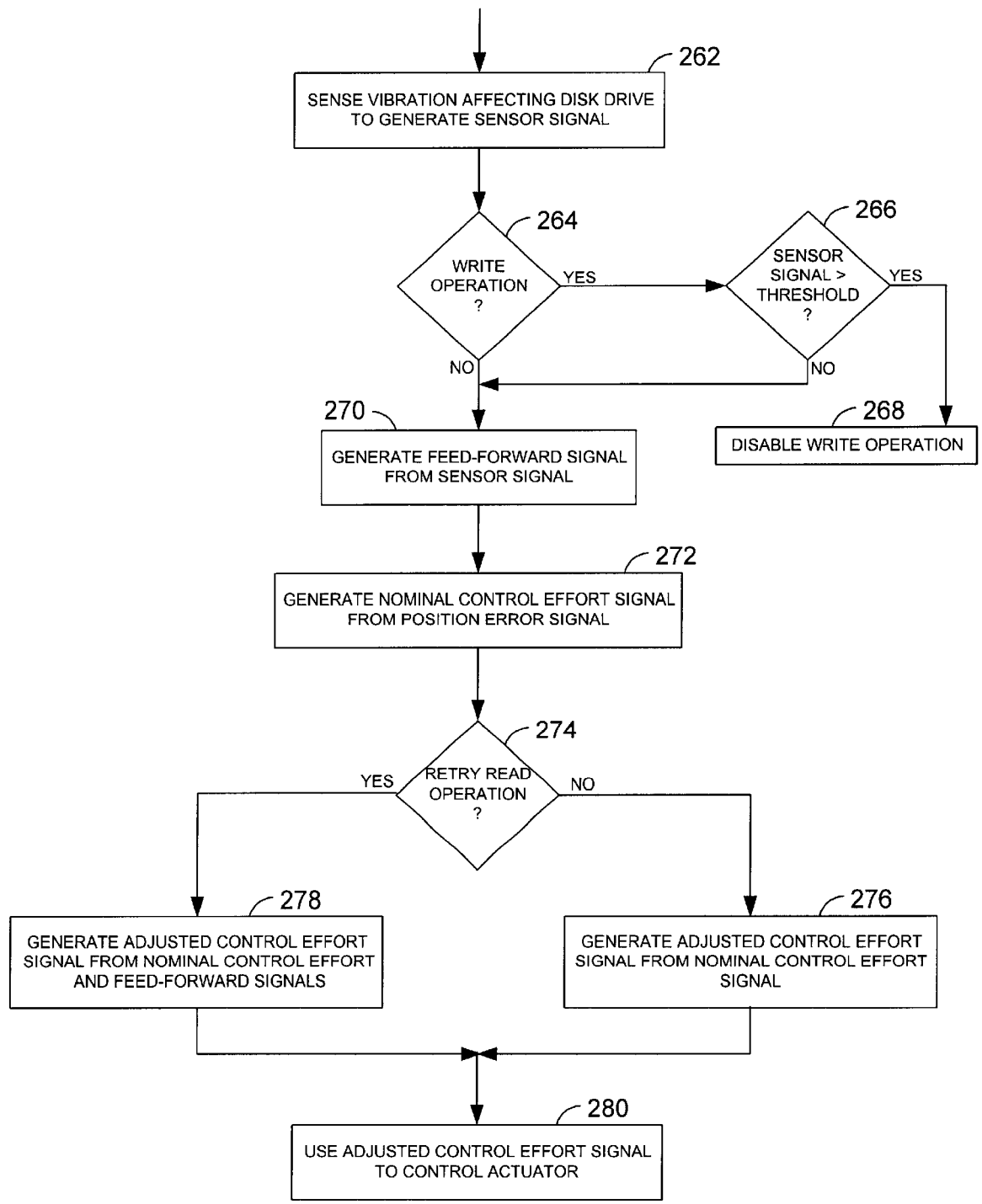
FIG. 7 is a flow chart illustrating how the vibration feed-forward signal is removed from the control effort signal during normal read operations, and included in the control effort signal during retry read operations.

Retry Read Operation—FIG. 7

FIG. 7 is a flow chart illustrating an embodiment of the present invention wherein the vibration compensation feed-forward signal 71 is disabled during normal read and write operations and only included in the adjusted control effort signal 123 to enhance retry read operations. At step 262 a vibration affecting the disk drive is sensed to generate a sensor signal. If the disk drive is executing a write operation at step 264, then the sensor signal is compared to a threshold at step 266. If the sensor signal exceeds the threshold, the disk drive disables the write operation at step 268 to prevent corrupting data recorded in adjacent tracks.

If at step 264 the disk drive is not executing a write operation or the sensor signal does not exceed the threshold, then at step 270 the sensor signal is processed to generate a feed-forward signal, and at step 272 a nominal control effort signal is generated from a position error signal (the position error signal generated from reading servo bursts recorded in the embedded servo sectors). If at step 274 the disk drive is not executing a retry read operation, then at step 276 an adjusted control effort signal is generated from the nominal control effort signal. If the disk drive is executing a retry read operation at step 274, then at step 278 an adjusted control effort signal is generated from the nominal control effort signal and the feed-forward signals. At step 280, the adjusted control effort signal is used to control the actuator in order to maintain proper tracking.

In one embodiment, the disk drive further comprises a plurality of programmable parameters (e.g., read channel parameters), wherein during a first number of disk revolutions of the retry read operation the disk drive modifies the programmable parameters with the adaptive vibration compensator disabled, and during a second number of disk revolutions of the retry read operation the disk drive enables the adaptive vibration compensator. In one embodiment, the adaptive vibration compensator comprises a programmable closed-loop parameter (e.g., the programmable gain in the adaptive gain filter 70 of FIG. 5), and during the second number of disk revolutions the disk drive adjusts the closed-loop parameter. This embodiment attempts to converge the closed-loop parameter to a value which eventually enables the successful recovery of the sector. Although the embodiment of FIG. 5 adapts a gain of the feed-forward signal 71 according to a LMS algorithm, any suitable-adaptive vibration compensation may be employed to enhance the retry read operation.

I claim:
1. A disk drive comprising:
   (a) a disk comprising a plurality of tracks;
   (b) a head;
   (c) an actuator, responsive to an adjusted control effort signal, for actuating the head radially over the disk;
   (d) a servo control system for generating the adjusted control effort signal, the servo control system comprising;
      a position error generator for generating a position error signal indicative of the head's position with respect to a centerline of a selected track;
      a servo compensator, responsive to the PES, for generating a nominal control effort signal;
      a sensor for sensing a vibration affecting the disk drive to generate a sensor signal;
      an adaptive vibration compensator, response to the sensor signal, for generating a feed-forward signal; and a signal generator for combining the nominal control effort signal with the feed-forward signal to generate the adjusted control effort signal applied to the actuator, wherein:

during a normal read operation the adaptive compensator is disabled to substantially remove the contribution of the feed-forward signal from the adjusted control effort signal; and during a retry read operation the adaptive compensator is enabled to include the contribution of the feed-forward signal in the adjusted control effort signal.

2. The disk drive as recited in claim 1, wherein:

(a) the disk drive further comprises a plurality of programmable parameters;

(b) during a first number of disk revolutions of the retry read operation the disk drive modifies the programmable parameters with the adaptive vibration compensator disabled; and (c) during a second number of disk revolutions of the retry read operation the disk drive enables the adaptive vibration compensator.

3. The disk drive as recited in claim 2, wherein:

(a) the adaptive vibration compensator comprises a programmable closed-loop parameter; and (b) during the second number of disk revolutions the disk drive adjusts the closed-loop parameter.

4. The disk drive as recited in claim 1, wherein the disk drive disables a normal write operation if the sensor signal exceeds a predetermined threshold.

5. A method of enhancing a retry read operation in a disk drive comprising a disk having a plurality of tracks, a head, an actuator responsive to an adjusted control effort signal for actuating the head radially over the disk, and a servo control system for generating the adjusted control effort signal, the method comprising the steps of:

(a) generating a position error signal indicative of the head's position with respect to a centerline of a selected track;

(b) processing the position error signal to generate a nominal control effort signal;

(c) sensing a vibration affecting the disk drive to generate a sensor signal;

(d) generating a feed-forward signal in response to the sensor signal;

(e) combining the nominal control effort signal with the feed-forward signal to generate the adjusted control effort signal applied to the actuator;

(f) during a normal read operation, substantially removing the contribution of the feed-forward signal from the adjusted control effort signal; and (g) during a retry read operation, including the contribution of the feed-forward signal in the adjusted control effort signal.

6. The method of enhancing a retry read operation in a disk drive as recited in claim 5, wherein the disk drive further comprises a plurality of programmable parameters, the method further comprising the steps of:

(a) during a first number of disk revolutions of the retry read operation, modifying the programmable parameters with the adaptive vibration compensator disabled; and (b) during a second number of disk revolutions of the retry read operation, enabling the adaptive vibration compensator.

7. The method of enhancing a retry read operation in a disk drive as recited in claim 6, further comprising the step of adjusting a closed-loop parameter associated with the feed-forward signal during the second number of revolutions.

8. The method of enhancing a retry read operation in a disk drive as recited in claim 6, further comprising the step of disabling a normal write operation if the sensor signal exceeds a predetermined threshold.

* * * * *